US009636669B2

United States Patent
Zones et al.

(10) Patent No.: US 9,636,669 B2
(45) Date of Patent: May 2, 2017

(54) ZEOLITIC MATERIALS WITH HETEROATOM SUBSTITUTIONS ON EXTERNAL SURFACE OF LATTICE FRAMEWORK

(71) Applicants: Stacey I. Zones, San Francisco, CA (US); Alexander S. Katz, El Sobrante, CA (US); Isao Ogino, Berkeley, CA (US); Xiaoying Ouyong, Berkeley, CA (US)

(72) Inventors: Stacey I. Zones, San Francisco, CA (US); Alexander S. Katz, El Sobrante, CA (US); Isao Ogino, Berkeley, CA (US); Xiaoying Ouyong, Berkeley, CA (US)

(73) Assignees: The Regents of the University of California, Oakland, CA (US); Chevron U.S.A. Inc., San Ramon, CA (US)

( * ) Notice: Subject to any disclaimer, the term of this patent is extended or adjusted under 35 U.S.C. 154(b) by 502 days.

(21) Appl. No.: 14/185,115

(22) Filed: Feb. 20, 2014

(65) Prior Publication Data
US 2014/0241982 A1    Aug. 28, 2014

Related U.S. Application Data

(60) Provisional application No. 61/768,234, filed on Feb. 22, 2013.

(51) Int. Cl.
*C01B 39/02* (2006.01)
*C01B 39/48* (2006.01)
(Continued)

(52) U.S. Cl.
CPC ............ *B01J 29/86* (2013.01); *B01J 29/061* (2013.01); *B01J 29/072* (2013.01); *B01J 29/70* (2013.01);
(Continued)

(58) Field of Classification Search
CPC ..... C01B 39/026; C01B 39/065; C01B 39/12; C01B 29/48; B01J 29/86; B01J 29/88;
(Continued)

(56) References Cited

U.S. PATENT DOCUMENTS 7,922,995 B2 * 4/2011 Vermeiren ............ C01B 37/005
423/122
9,168,513 B2 * 10/2015 Mueller ................... B01J 29/04
(Continued)

OTHER PUBLICATIONS

C. W. Jones et al., "Synthesis of Hydrophobic Molecular Sieves by Hydrothermal Treatment with Acetic Acid" Chem. Mater., 2001, vol. 13, No. 3, pp. 1041-1050.
(Continued)

*Primary Examiner* — David M Brunsman
(74) *Attorney, Agent, or Firm* — E. Joseph Gess; Melissa M. Hayworth

(57) ABSTRACT

A zeolite material is provided having non-boron heteroatoms on the external surface of the zeolitic material lattice framework and B heteroatoms, or silanols created from boron hydrolysis, throughout the remainder of the lattice framework. The lattice framework of the zeolite material comprises large pore 12 member ring or larger openings at the external surface of the framework, and 10 member ring or smaller openings beneath the external surface large pore openings. Also provided is a process for preparing the zeolitic material.

19 Claims, 2 Drawing Sheets

(51) Int. Cl.
  *B01J 29/06* (2006.01)
  *B01J 29/072* (2006.01)
  *B01J 29/86* (2006.01)
  *B01J 29/70* (2006.01)
  *B01J 29/76* (2006.01)
  *B01J 35/10* (2006.01)

(52) U.S. Cl.
  CPC ........... *B01J 29/76* (2013.01); *B01J 35/1014* (2013.01); *C01B 39/026* (2013.01); *C01B 39/48* (2013.01)

(58) Field of Classification Search
  CPC . B01J 29/89; B01J 29/76; B01J 29/061; B01J 29/072
  See application file for complete search history.

(56) References Cited

U.S. PATENT DOCUMENTS 9,371,239 B2 * 6/2016 Parvulescu ........... C01B 39/026
2003/0133870 A1    7/2003 Chen et al.
2004/0171888 A1    9/2004 Perego et al.
2008/0050308 A1 *  2/2008 Vermeiren ............ B01J 29/06
                                                        423/704
2012/0148487 A1    6/2012 Katz et al.
2013/0202523 A1 *  8/2013 Mueller ................ B01J 29/04
                                                        423/700
2014/0241982 A1 *  8/2014 Zones ................... B01J 29/86
                                                        423/713

OTHER PUBLICATIONS

M. Dodin et al., "A Zeolitic Material with a Three-Dimensional Pore System Formed by Straight 12- and 10-Ring Channels Synthesized with an Imidazolium Derivative as Structure-Directing Agent", Journal of American Chem. Soc., 2010, vol. 132, No. 30, pp. 10221-10223.

International Search Report from corresponding PCT Application PCT/US2014/017616 mailed on Jul. 14, 2014.

* cited by examiner (a)           (b)

ZEOLITIC MATERIALS WITH HETEROATOM SUBSTITUTIONS ON EXTERNAL SURFACE OF LATTICE FRAMEWORK

CROSS-REFERENCE TO RELATED PATENT APPLICATION

The present application claims priority to U.S. Provisional Application No. 61/768,234, filed on Feb. 22, 2013, entitled "Novel Zeolitic Materials with Heteroatom Substitutions on External Surface of Lattice Framework", the entire contents of which are hereby incorporated by reference in their entirety.

FIELD OF THE INVENTION

The present invention relates to zeolitic materials with selective substitution. More specifically, the present invention relates to zeolitic materials selectively substituted on the external surface, and methods of preparing same.

BACKGROUND OF THE INVENTION

Description of the Related Art

Aluminum heteroatoms (Al) have been exchanged or substituted for boron heteroatom (B) in zeolites for many years. This exchange changes a weak acid zeolite into one that is more highly acid. Catalysis by acid sites can impact rates of chemical reaction, rates of mass transfer, selectivity to products and deactivation of the catalytic site or pore system. Better control of the acid sites would help to provide selective control of the overall catalysis.

Though substitution of aluminum for boron has previously been used, the result has been the extremes: the use of 10-MR zeolites where essentially no heteroatom exchange occurs (e.g., ZSM-11) or the use large- or extra-large pore zeolites where essentially all B heteroatoms are exchanged (e.g., SSZ-33). See, for example, Chen, C. Y.; Zones, S. I., "Method for Heteroatom Lattice Substitution in Large and Extra-Large Pore Borosilicate Zeolites," U.S. Pat. No. 6,468,501 B1, Oct. 22, 2002; Chen, C. Y.; Zones, S. I., "Method to Improve Heteroatom Lattice Substitution in Large and Extra-Large Pore Borosilicate Zeolites," U.S. Pat. No. 6,468,501 B1, Sep. 14, 2004; Chen, C. Y.; Zones, S. I. *In Studies in Surface Science and Catalysis*"; Galarneau, A., Fajula, F., Di Renzo, F., Vedrine, J., Eds.; Elsevier: 2001; Vol. 135; Chen, C. Y.; Zones, S. I. *In Zeolites and Catalysis*; and Čejka, J., Corma, A., Zones, S. I., Eds. 2010, Vol. 1, p. 155. In these instances, acidic conditions are preferred to prevent dissolution of Si from the framework. In the aqueous $Al(NO_3)_3$ solution used, the hydrated aluminum cations used in the Al-exchange are too large to enter the 10-MR pores such as ZSM-11. See, for example, Chen, C. Y.; Zones, S. I. *In Studies in Surface Science and Catalysis*, Galarneau, A., Fajula, F., Di Renzo, F., Vedrine, J., Eds., Elsevier: 2001, Vol. 135; Chen, C. Y.; Zones, S. I. *In Zeolites and Catalysis*, Čejka, J., Corma, A., Zones, S. I., Eds. 2010, Vol. 1, p. 155. In the Al-exchange of B-SSZ-33, the Si/B values increase from 18 to more than 200, and Si/Al values from 12 to 24, indicating exchange of most B heteroatoms for Al. See, Chen, C. Y.; Zones, S. I. *In Studies in Surface Science and Catalysis*, Galarneau, A., Fajula, F., Di Renzo, F., Vedrine, J., Eds., Elsevier: 2001, Vol. 135. The result is that either all or none of the boron was exchanged. No selective control is possible.

Catalysis by MCM-22, an aluminosilicate containing Al heteroatoms throughout the lattice framework, and therefore in all three pore systems, is characterized as between a large- and a medium-pore zeolite because it consists of both 10-MR (medium) and 12-MR (large) pores. The role of the acid sites on the external surface hemicages has been determined to differ from those of the internal pore systems through experiments that poison or coke (i.e., formation of carbonaceous deposits in the pore system) the catalytic sites. See, Laforge, S.; Martin, D.; Paillaud, J. L.; Guisnet, M. *J. Catal.* 2003, 220, 92; Laforge, S.; Martin, D.; Guisnet, M. *Microporous Mesoporous Mater.* 2004, 67, 235; Laforge, S.; Martin, D.; Guisnet, M. *Appl. Catal. A: Gen.* 2004, 268, 33; Matias, P.; Lopes, J. M.; Laforge, S.; Magnoux, P.; Guisnet, M.; Ramôa Ribeiro, F. *Appl. Catal. A: Gen.* 2008, 351, 174; Matias, P.; Lopes, J. M.; Laforge, S.; Magnoux, P.; Russo, P. A.; Ribeiro Carrott, M. M. L.; Guisnet, M.; Ramôa Ribeiro, F. *J. Catal.* 2008, 259, 190. To selectively be able to use acid sites on the external surface would greatly improve one's ability to control a catalysis, and would be of great value to the industry.

SUMMARY OF THE INVENTION

By the present invention, a method for the substitution of B heteroatoms in the lattice framework with other heteroatoms, such as Al, so that the heteroatom is essentially only on the external surface is provided. The site selective exchange of these framework heteroatoms can enable site selective adsorption or catalysis, for example, in an MWW framework zeolite. Surprisingly, a method has been discovered which selectively allows the substitution of external surface sites consisting of B heteroatoms or silanols with a non-boron heteroatom, such as Al, Ti or Fe heteroatoms.

It has been shown that heteroatom exchange, e.g., Al, Ti or Fe, for B in zeolites consisting of 10- and 12-MR occurs specifically at the external surface. Such external surface functionality with, for example, Al sites allows Al to be placed in specific locations, which are accessible to bulky molecules for catalysis and adsorption. The resulting zeolitic material has non-boron heteroatoms, such as Al, Ti or Fe heteroatoms, on the external surface of the zeolite lattice framework, and B heteroatoms, or silanols created from boron hydrolysis, throughout the remainder of the lattice framework.

In one embodiment, the process for preparing the zeolitic material comprises first selecting or preparing a zeolitic material having B heteroatoms and silanols throughout the lattice framework, and a structure with a lattice framework having large pore 12 member rings (MR) or larger openings at the external surface of the framework, and 10 member rings or smaller openings beneath the external surface large pore openings. The B heteroatoms or silanols on the external surface of the zeolitic material lattice framework are then substituted or exchanged with non-boron heteroatoms, such as Al, Ti or Fe heteroatoms.

DETAILED DESCRIPTION OF THE INVENTION

The present discovery uses zeolites which consist of some pore systems that exclude by size non-boron heteroatoms, such as aluminum cations, resulting in site selective exchange on the external surface, which leads to new site selective catalysts previously not available.

Surprisingly, a method has been discovered which for zeolites, particularly with 10- and 12-member rings, selectively allows access of bulky molecules to only the larger pores, and results in a substitution of a specific fraction of the B heteroatoms with a heteroatom such as Al. This discovery provides a means for site selective adsorption or catalysis that has not been previously possible.

One example zeolite used is the MWW zeolite, ERB-1 (see Belussi, G., Perego, G., Clerici, M. G. and Giusti, A. Eur. Pat. Appl. EP0293032, 1988) which contains three different and non-intersecting pore systems (FIG. 1): Internal supercages and internal sinusoidal channels both only accessible through 10-MR openings; and external hemi-cages accessible through a 12-MR openings. Catalysis by acid sites in each of the pore systems can differ, for example, in rates of chemical reaction, rates of mass transfer, selectivity to products, and deactivation of the catalytic site or pore system.

Figure 1:
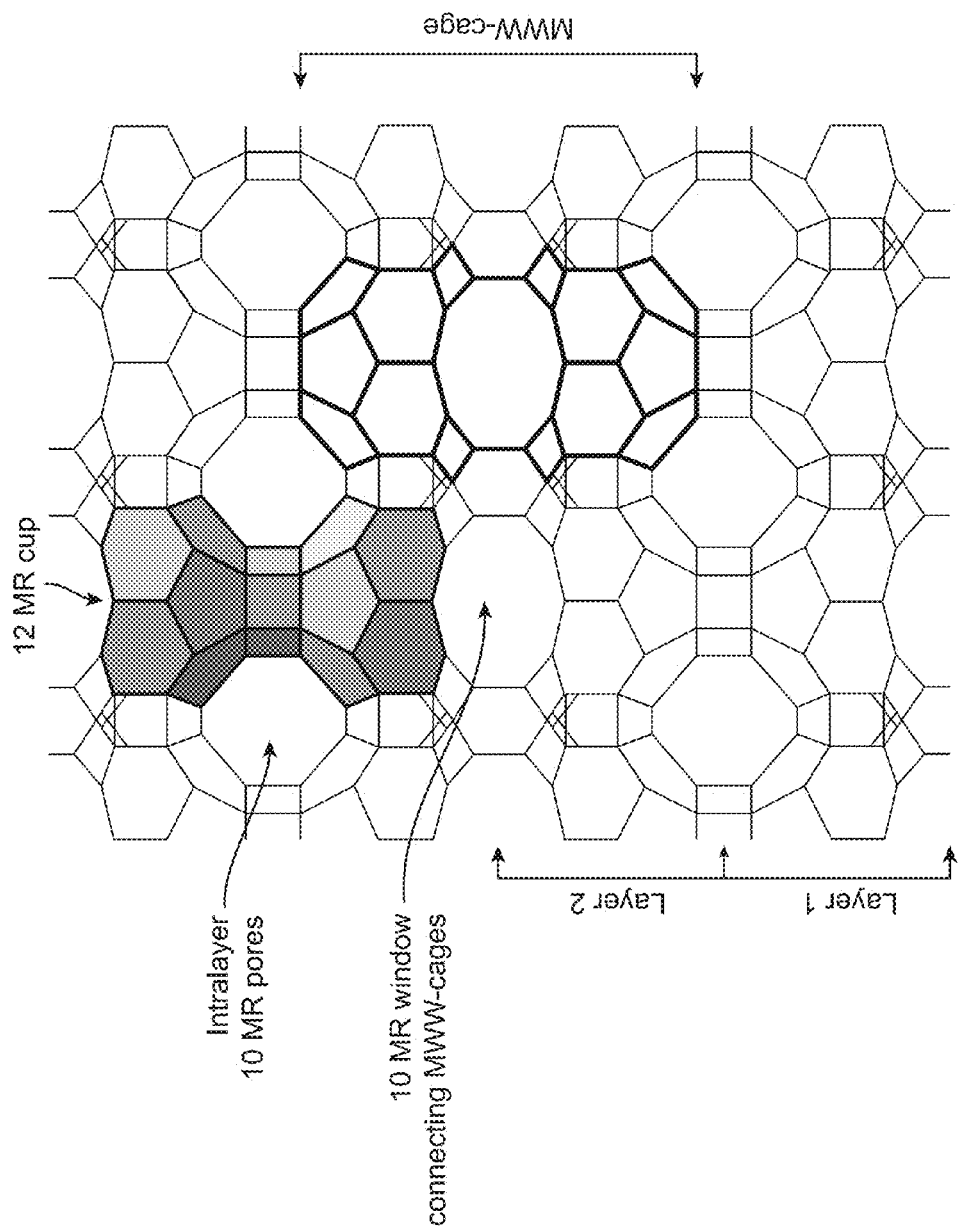
FIG. 1 shows a schematic representation of a MWW framework structure.

Turning to FIG. 1, shown is a schematic representation of the MWW framework structure. The vertices represent silicon or heteroatoms, and oxygen atoms are omitted for clarity. The shaded region shows two 12 MR "cups" back to back, connected by a double six ring; the 12-MR hemi-cage on the surface does not require access through a 10 MR aperture. The MWW supercage is also highlighted in bold. The third pore system is the 10 MR intralayer sinusoidal channel accessed by way of a 10 MR pore.

In one embodiment, the process for preparing the zeolitic material comprises first selecting or preparing a zeolitic material having B heteroatoms or silanols throughout the lattice framework, and a structure with a lattice framework having large pore 12 member rings (MR) or larger openings at the external surface of the framework, and 10 member rings or smaller openings beneath the external surface large pore openings. The B heteroatoms on the external surface of the zeolitic material lattice framework, or the silanols created removing the boron, are then substituted or exchanged with suitable non-boron heteroatoms such as Al, Ti or Fe heteroatoms.

In one embodiment, the process will involve a zeolitic material with the external surface of the framework comprising the 12 member ring or larger openings, with 10 member ring or smaller openings beneath the external surface 12 member ring openings. For example, the zeolitic material can be selected from the group of zeolite materials having a framework structure such as SSZ-70 and ERB-1.

In one embodiment, the zeolitic material exchanged is a delaminated material. Any delamination method can be used. In one embodiment, however, the delamination is achieved through the use of chloride and fluoride anion exfoliation. The use of such a method avoids the presence of an amorphous phase in the oxide materials, thereby preserving more integrity of the two-dimensional zeolite layers, as characterized, for example, by a more intense sharp peak in the 20-30 2θ/degrees range of their X-ray diffraction patterns compared to other conventional delaminated layered zeolite materials.

In the present method involving halide anion delamination of a layered zeolite material, an aqueous mixture or an organic solvent mixture of chloride and fluoride anions is used in affecting the delamination. Bromide anion can also be present. Generally, a surfactant is used, for example, such as cetyltrimethyl ammonium bromide (CTAB). The use of such a surfactant is a preferred embodiment.

The mixtures are maintained at a temperature in the range of from 5-150° C. for a length of time sufficient to effect the desired delamination, e.g., for 30 minutes to one month. The mixture can then be subjected to sonication, or the process can be completed in the absence of sonication. Sonication, however, is preferred. The oxide product is recovered, often using centrifugation.

When using an aqueous mixture, an aqueous mixture of chloride and fluoride anions, e.g., alkylammoniumhalides, and the layered zeolite material, the novel oxide product is prepared at a pH less than 12, e.g., about 9, and maintained at a temperature in the range of 5-150° C. for a length of time sufficient to effect the desired delamination. The oxide product is then recovered, e.g., by sonication followed by centrifugation.

When instead using a non-aqueous mixture of chloride and fluoride anions, i.e., a mixture comprising an organic solvent, the mixture is also maintained at a temperature in the range of from 5-150° C. to effect desired delamination. The organic solvent can be any suitable organic solvent, which swells the starting material such as dimethyl formamide (DMF). The delaminated product can then be recovered from the mixture. Generally, sonication prior to recovery is employed.

In one embodiment, the method of preparing the delaminated layered zeolite material comprises preparing an aqueous mixture of chloride and fluoride anions with a layered zeolite material to be delaminated. The mixture also generally contains a surfactant such as CTAB. The aqueous mixture is maintained at a pH of 12 or less, e.g., around 9, generally at a temperature in the range of about 5-150° C. to effect the desired delamination. A delaminated zeolite material is then recovered after centrifugation, and can be obtained in yields exceeding 90 wt %. The use of milder conditions, especially pH, during the synthesis using an aqueous solution substantially avoids the creation of an amorphous phase.

In another embodiment, the method of preparing the delaminated layered zeolite material comprises preparing a non-aqueous mixture of chloride and fluoride anions with a layered zeolite material to be delaminated. The mixture also generally contains a surfactant such as CTAB. The mixture is heated at a temperature in the range of about 5-150° C. to effect the desired delamination. The non-aqueous mixture generally comprises an organic solvent such as dimethyl formamide (DMF). A delaminated zeolite material is then recovered after filtration, or, alternatively, the delaminated zeolite material is then recovered after deionized water wash and filtration.

In another embodiment, the method of preparing the delaminated layered zeolite material comprises preparing a non-aqueous mixture, e.g., using an organic solvent such as dimethyl formamide, of chloride and fluoride anions with a layered zeolite material to be delaminated. The mixture also generally contains a surfactant such as CTAB. After heating the mixture at a temperature in the range of from about 5-150° C. to affect the desired delamination, the mixture is subjected to sonication and filtration. The delaminated zeolite material is then recovered.

The foregoing process permits one to prepare a delaminated zeolite material by using a combination of chloride and fluoride anions, e.g., from a combination of alkylammonium fluoride and chloride surfactants. The process avoids the creation of an amorphous silica phase. When using an aqueous mixture, the process permits milder conditions of pH than have heretofore been possible. The pH can be less than 12, and essentially avoids the creation of an amorphous silica phase. For example, in an aqueous solution of pH 12 or less, delamination of a layered zeolite material is achieved to provide a stable product. The process can also be performed in a non-aqueous mixture, with which sonication can be used.

The layered zeolite materials to be delaminated in accordance with the present process can be any layered zeolite material, as long as the external surface layer comprises 12 member ring or larger openings, and the layer beneath comprises 10 member ring or smaller openings. The ultimate product will depend upon the starting material and the particular process steps used. Examples of suitable layered zeolite materials include SSZ-25, ERB-1, PREFER, SSZ-70 (e.g., B-SSZ-70) and Nu-6 (1).

The chloride and fluoride anions can be obtained from any source of the anions. Any compound which will provide the anions in aqueous solution can be used. The cation is not important. Providing the fluoride and chloride anions is important. The cations can be any cation, with the use of alkylammonium cations being suitable in one embodiment. The alkyl group of such a cation can be any length, and in one embodiment ranges from 1-20 carbons. Tetrabutylammonium cations in particular have been found useful. The molar ratio of chloride to fluoride anions can be 100 or less, generally from 100:1 to 1:100. In one embodiment, the ratio can range from 50:1 to 1:50.

It is the combination of the fluoride and chloride anions which has been discovered to be important. When delamination was attempted with fluoride without chloride, the PXRD pattern of the dried product clearly showed retention of strong 001 and 002 peaks, indicating that efficient delamination requires chloride anions as well. On the other hand, fluoride is also a necessary component because delamination using only chloride in the absence of fluoride results in partial delamination.

The pH used in the present synthesis when an aqueous mixture is used is lower than that generally used in delamination syntheses. The pH is generally 12 or less, but can be any pH which does not amorphasize the silica in the zeolite to create an amorphous silica phase. A pH of 12 or less generally accomplishes this task and thereby allows one to obtain a delaminated layered zeolite material substantially without an amorphous phase. In another embodiment, the pH is 11 or less, and even 10 or less, with a pH of about 9 or less also being quite advantageous.

The temperature used in the process for either the aqueous or non-aqueous mixture can range widely. In general a temperature for the aqueous solution of from 5-150° C. is suitable. In another embodiment, the temperature can range from 50-100° C.

The length of time the zeolite is allowed to swell, and delaminate, in the aqueous solution can vary greatly. Generally, the time can vary from 30 minutes to one month. In one embodiment, the time ranges from 2 hours to 50 hours. In another embodiment, the time can range from 5 to 20 hours prior to collection of the product.

In substituting or exchanging the external surface B heteroatoms with the Al, Ti or Fe heteroatoms, particularly Al heteroatoms, conventional exchange techniques can be used. For example, in exchanging Al atoms for B, an aluminum nitrate solution can be used. Generally, the aluminum nitrate solution is used to contact the zeolitic material for a time, and at a temperature, sufficient to effect the exchange. The temperature can range from 50-200° C., and the time can range from 1-7 days.

The zeolitic material obtained can have non-boron heteroatoms, such as Al, Ti or Fe heteroatoms, on the external surface of the zeolitic lattice framework and B heteroatoms, or silanols created from boron hydrolysis, throughout the remainder of the lattice framework. In one embodiment, Al heteroatoms are on the external surface. The lattice framework comprises large pore 12 member ring or larger openings at the external surface of the framework, and 10 member ring or smaller openings beneath the external surface large pore openings. In one embodiment, the external surface of the framework comprises 12 member ring openings with 10 member ring openings beneath the 12 member ring openings. In one embodiment, the zeolite material is of a framework structure selected from SSZ-70 and ERB-1. Zeolite materials of the MWW framework are quite suitable.

The resultant zeolitic materials are quite applicable as catalysts. For example, the zeolitic materials can be used as catalysts in hydrocarbon reactions, and can be tailored therefore.

The following examples are provided to further illustrate the present invention, but are in no way meant to be limiting.

Example 1

Figure 2:
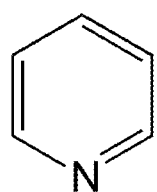
FIG. 2 shows a schematic illustration of pyridine (a) and acridine (b), which were used to determine the number of Brønsted acid sites in the Al-exchanged ERB-1 zeolite.
Figure 2:
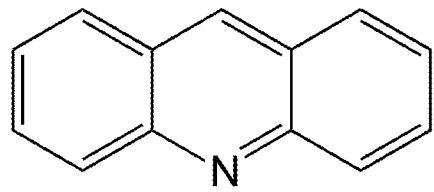

One example of the utility of the Al-exchanged ERB-1 is shown in the chemisorption of both small (pyridine) and bulky (acridine) amines, shown in FIG. 2. Pyridine is a small molecule that can easily fit into both the 10 and 12-MR pores. Acridine is a bulky molecule that can only fit into 12-MR pores, and is excluded from 10-MR pores.

The Al-exchanged ERB-1 was synthesized as follows: The as-made ERB-1 was calcined in diluted air using a ramp program: 1° C./min to 120° C., held for 2 hours, and then increased at a rate of 1° C./min to 550° C., and held for 5 hours. In a typical treatment, 0.20 g of the calcined ERB-1 was put into a 48 mL glass tube reactor with 13 mL of water and 2 g of aluminum nitrate nonahydrate. The pH was measured prior to heating and was around 2.7. The glass tube reactor was then heated in an oil bath with vigorous stirring at 100° C. for 100 hours. The reaction was then stopped and the pH measured again, which typically drops below pH 2. The well-mixed slurry was poured into a fine fritted glass funnel and filtered to separate the solid from the liquid. While in the glass funnel, the solids were re-suspended in 100 mL of pH=2 HCl solution for 10 min before applying vacuum to quickly filter the solution. This step was repeated with another 100 mL HCl solution. Finally, the solids were washed with 200 mL deionized water. The material is then calcined to 550° C., following the previous ramp program to obtain the Al-exchanged ERB-1.

The number of Brønsted acid sites was determined by amine chemisorption. Pyridine adsorption was carried out by thermogravimetric analysis (TGA) by using a TA Instruments TGA 2950. Approximately 30 mg of calcined Al-exchanged ERB-1 was loaded into a TGA sample pan. $N_2$ (purified by a moisture trap) flowed through the furnace at a rate of 100 mL/min. The sample temperature was heated from ambient to 550° C. at a rate of 2.5° C./min and held at this temperature for 3 h. The temperature was then decreased to 200° C. After the mass of the sample stabilized (e.g., a approximate steady-state mass) at this temperature, 50 µL of either pyridine (Sigma) was injected into the gas flow path leading into the TGA furnace. Once a near steady-state was achieved after the amine injection, the mass of the chemisorbed pyridine was used to determine the number of acid sites by converting the increase in mass (in mg) to μmol of pyridine by using the molecular weight of pyridine (MW=79.1 g/mol) and dividing this value by the mass of the zeolite just prior to amine injection into the process line.

Acridine chemisorption experiments are performed on a Varian Cary 400 UV-VIS spectrometer. The zeolite sample is dried overnight at 175° C. and cooled down in a desiccator. Acridine (supplier, grade) is recrystallized three times in ethanol and used to prepare a 500 μmol acridine/g hexane stock solution. 2 mL of the acridine stock solution is added to approximately 3.00 mg zeolite for titration. The titrated solution is collected 1 hour after the titration and passed through a 0.45 μm syringe filter. The difference of UV-vis absorbance of the stock solution and titrated solution is recorded and calculated by a UV-vis spectrometer. The decrease in UV-vis absorbance after titration is used to calculate the external acid sites.

The amine chemisorption results, in Table 1, show similar uptakes of pyridine and acridine. This result is only expected if the Al-heteroatoms are only exchanged onto the external surface of the zeolite and are accessible to both pyridine and acridine. Pyridine adsorption is slightly greater than acridine and can be explained by the possibility of closely positioned Al in the lattice such that a single bulky acridine blocked the ability of another acridine molecule to adsorb to the neighboring Al-heteroatom. Pyridine is smaller and would not block neighboring sites to the same extent as acridine. However, the similarity of the adsorbed amounts of pyridine and acridine suggests that they are both sampling predominantly the same external surface sites.

TABLE 1

Chemisorption of pyridine and acridine by Al-exchanged ERB-1.

|  | Pyridine, μmol/g | Acridine, μmol/g |
|---|---|---|
| Al-exchanged ERB-1 | 42 | 38 |

Example 2

In this example, the preparation of a UCB-4 material is described, which then is subjected to partial repopulation of boron sites for aluminum where they are only in the large pore pockets or cups on the exterior sheets.

A borosilicate zeolite (precursor) B-SSZ-70 is synthesized by using the method of Archer (Microporous and Mesoporous Materials 130, 201 pp. 255-265) where the Diisobutyl imidazolium cation is used as the Structure-Directing agent (SDA) to direct the synthesis. The product is confirmed to be SSZ-70 by xrd analysis The B-SSZ-70 is then subjected to partial delamination in the following series of treatments:

3.19 grams of zeolite is mixed into a solution of 45 ml of dimethylformamide (DMF) with 3.6 grams of cetyltrimethyl ammonium bromide (CTAB) surfactant, and 5.5 grams each of tetrabutylammonium fluoride and tetrabutyl ammonium chloride. This treatment follows from the earlier method of Ogino et al (UC Berkeley assignee, *J. Am. Chem. Soc.* 2011). Unlike the earlier method the mix was heated for 4 days at 95° C., instead of 16 hours. The reaction was carried out in a glass bottle in an oven and without mixing. At the end of the time period, the reaction was cooled and the mixture was transferred into an open cup, which was placed in an ice bath for cooling. Then a sonication treatment was begun using the pulse sequence described by Ogino. The treatment was for 90 minutes and the temperature was observed to stay below 30° C. in the reaction with the ice batch surrounding it. The material was collected by centrifugation to separate the solids from the DMF reaction solution. The solids were re-suspended in tetrahydrofuran and then re-centrifuged. This process was repeated and the second centrifugation was followed by mixing the solids into diethyl ether and filtering. The collected, dried solids (which have not seen any water), give an XRD pattern consistent with large strong new lines related to the intercalation of the surfactant.

The solid material was then calcined in nitrogen atmosphere with a slight bleed of air into the oven. The material was heated at 1 degree C./min to 120° C. and held there for 2 hours. Then the same ramp was continued to 540° C. and the material was held at this temperature for 5 hours. The product inspections are shown in the Table below.

The aluminum re-insertion experiment to put Al sites on the exterior cups or pockets from the UCB-4 material (the product from step 2 above) was carried out as follows:

In a glass bottle with cap, 2.03 grams of UCB-4 is mixed with 7.5 grams of aluminum nitrate, nonahydrate in 50 ml of water. The bottle is heated without mixing to 95° C. for 5 days. Previous ranges of treatments for other borosilicate zeolites have been described by Chen and Zones (C. Y. Chen and S. I. Zones in "Zeolites and Catalysis, synthesis, reactions and applications" Edited by J. Cejka, A. Corma and S. I. Zones, pages 155-170 and references cited therein, Wiley-VCH, 2010). The cooled solution then has the solution decanted and is replaced with 50 ml of pH=2 HCl solution (needed to remove unreacted aluminum cations, stable in acidic solutions). This wash is repeated and then the solids are collected by filtration and washed with water. The effectiveness of the treatment is seen below.

TABLE 2

Selected Properties of BSSZ-70, UCB-4, and AL-UCB-4

| MATERIAL | EXTERNAL SURFACE AREA | MICROPORE | WT % Al | WT % Si |
|---|---|---|---|---|
| B SSZ-70 | 45 M2/GM | 0.18 | 0 | 42 |
| UCB-4 | 86 | 0.15 | — | — |
| AL-UCB-4 | — | — | 0.90 | 40.3 |
| AL-BSSZ-70* | — | — | 0.31 | 41.7 |

*this is a boron SSZ-70, directly calcined without step 2 above and then given the same Al treatment as in 3.

From Table 2 it can be seen that (1) the delamination procedure roughly doubles the measured external surface area from the parent BSSZ-70 calcined. In turn the micropore volume (as expected) shows a drop (2). The repopulation of external boron sites by Al is much greater after the delamination treatment.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A zeolite material having non-boron heteroatoms on the external surface of the zeolitic material lattice framework and only B heteroatoms, or silanols created from boron hydrolysis, throughout the remainder of the lattice framework.

2. The zeolite material of claim 1, wherein the lattice framework comprises large pore 12 member ring or larger openings at the external surface of the framework, and 10 member ring or smaller openings beneath the external surface large pore openings.

3. The zeolite material of claim 2, wherein the external surface of the framework comprises 12 member ring openings with 10 member ring openings beneath the external surface 12 member ring openings.

4. The zeolite material of claim 2, wherein the zeolite material has Al, Fe or Ti heteroatoms on the external surface of the lattice framework.

5. The zeolite material of claim 1, wherein the zeolite material has Al, Fe or Ti heteroatoms on the external surface of the lattice framework.

6. The zeolite material of claim 1, wherein the zeolite material is of a framework structure selected from the group consisting of SSZ-70 and ERB-1.

7. The zeolite material of claim 6, wherein the zeolite material is a delaminated zeolitic material.

8. The zeolite material of claim 1, wherein the zeolite material is of a MWW framework structure.

9. The zeolite material of claim 1, wherein the zeolite material is a delaminated zeolitic material.

10. A catalyst comprising the zeolite of claim 1.

11. A zeolitic material having Al heteroatoms only on the external surface of the zeolitic material lattice framework and B heteroatoms throughout the remainder of the lattice framework, with the external surface of the framework comprising 12 member ring openings with 10 member ring openings beneath the external surface 12 member ring openings, and with the zeolitic material being a delaminated zeolitic material.

12. A process for preparing the zeolitic material of claim 1, comprising the steps of:
   (i) selecting or preparing a zeolitic material having a structure with a lattice framework comprising large pore 12 member rings or larger openings at the external surface of the framework, and 10 member rings or smaller openings beneath the external surface large pore openings, and B heteroatoms or silanols that are created from boron hydrolysis throughout the lattice framework; and
   (ii) substituting the B heteroatoms or silanols on the external surface of the zeolitic material lattice framework with non-boron heteroatoms.

13. The process of claim 12, wherein the B heteroatoms or silanols in (ii) on the external surface are substituted with Al, Fe or Ti heteroatoms.

14. The process of claim 13, wherein the substitution is conducted by contacting the zeolitic material of (i) with an aluminum nitrate solution.

15. The process of claim 14, wherein the contacting is conducted at a temperature of 50-200° C. for 1-7 days.

16. The process of claim 12, wherein the zeolitic material of (i) is of a framework structure selected from the group consisting of SSZ-70 and ERB-1.

17. The process of claim 12, wherein the zeolitic material of (i) is of a MWW framework structure.

18. The process of claim 12, wherein the zeolitic material of (i) is a delaminated zeolite material.

19. The process of claim 18, wherein the delaminated zeolite material is obtained by preparing an aqueous mixture of chloride and fluoride anions and a layered zeolite material, maintaining the aqueous mixture at a temperature in the range of 5-150° C. for a length of time to effect delamination, and then recovering the delaminated zeolite material.

* * * * *